Patented May 5, 1942

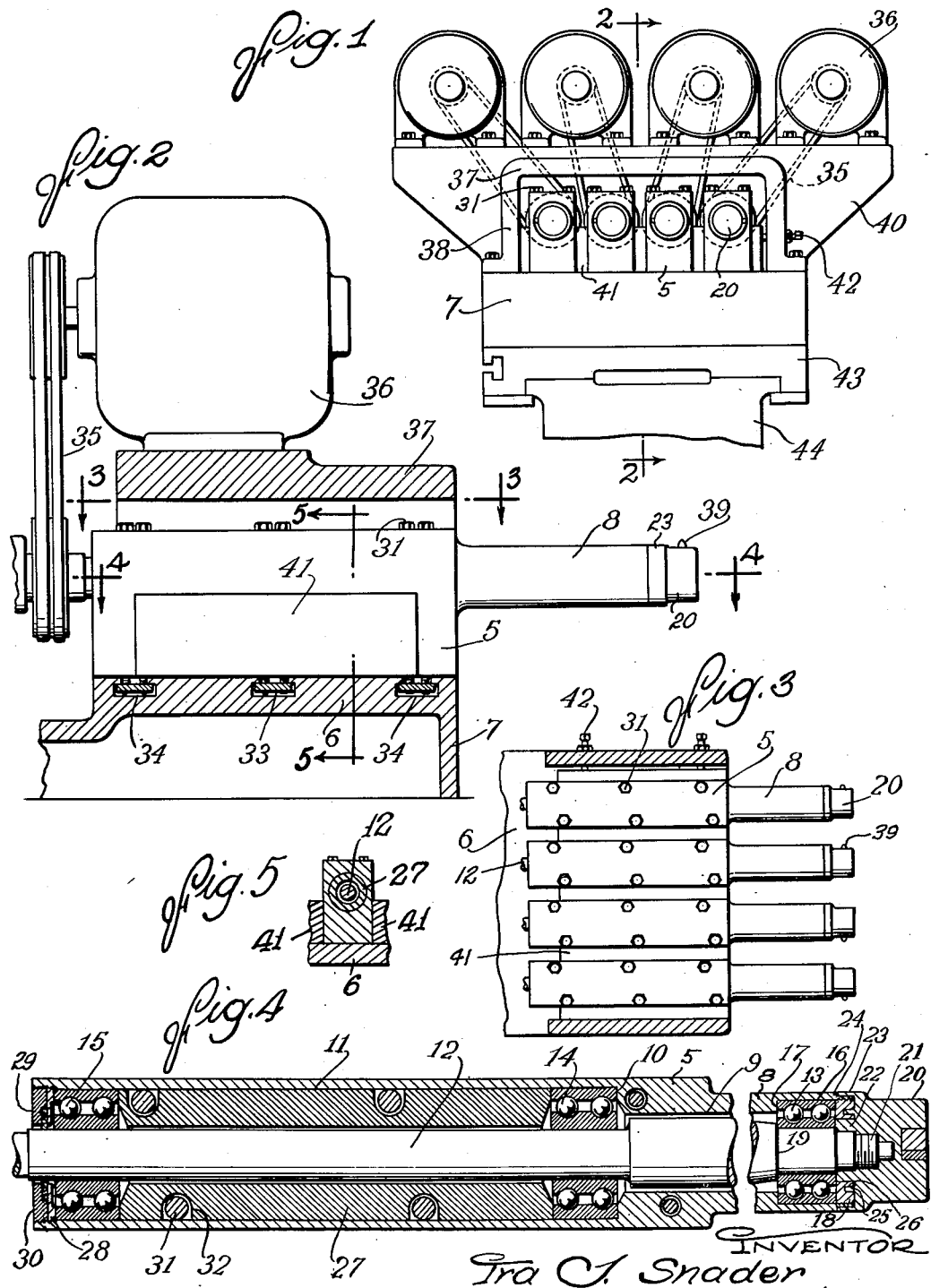

2,281,628

UNITED STATES PATENT OFFICE 2,281,628

SPINDLE STRUCTURE

Ira J. Snader, Detroit, Mich., assignor to Ex-Cell-O Corporation, Detroit, Mich., a corporation of Michigan Original application February 26, 1937, Serial No. 127,967. Divided and this application February 8, 1939, Serial No. 255,175

13 Claims. (Cl. 77—3)

The present invention relates to improvements in spindle structures, and is a division of my copending application Serial No. 127,967, filed February 26, 1937.

One of the important objects of the present invention is to provide a novel spindle structure having a body in which a spindle is rotatably supported in antifriction bearings, and which has an overall width just sufficient to enclose said bearings, so as to permit close lateral spacing of the axes of a plurality of the spindles mounted in parallel relation for simultaneous operation.

Another object is to provide a new and improved spindle structure having a minimum lateral dimension and, at the same time, having substantial mass so as to provide strength and rigidity.

A more specific object is to provide a novel spindle structure having a transversely rectangular spindle supporting body with substantially square edges, and with a longitudinal tubular extension, on one end of and disposed eccentrically to the center line of the body, through which the operative end of the spindle projects.

Still another object is to provide a new and improved mounting for a plurality of spindle structures of the foregoing character permitting convenient and accurate relative lateral adjustment of the spindle axes.

Further objects and advantages will become apparent as the description proceeds.

In the accompanying drawing, Figure 1 is an end view of a plurality of spindle structures and the mounting therefor embodying the features of my invention.

Figure 2 is a fragmentary vertical sectional view, on an enlarged scale, taken along line 2—2 of Fig. 1.

Fig. 3 is a horizontal sectional view on a reduced scale taken along line 3—3 of Fig. 2.

Fig. 4 is a horizontal sectional view on an enlarged scale of one of the spindle structures taken along line 4—4 of Fig. 2.

Fig. 5 is a fragmentary cross-sectional view taken along line 5—5 of Fig. 2.

In various modern machine tools, a plurality of spindle structures, each provided with a rotary spindle, are mounted in parallel relation on a common support for simultaneous operation, for example, to bore all the aligned cylinders of an automotive engine block in one cutting stroke. Regardless of the nature of the machining operation to be performed, difficulty is often experienced in mounting the spindle structures with sufficiently small center distances between the axes to permit operation on contiguous work surfaces. In the case of automotive engine blocks, difficulty arises when the spacing of the cylinders is less than the minimum obtainable spacing of the spindle axes. It has therefore been the practice heretofore in such instances to bore alternate cylinders in one operation, and than to index or reload the work and bore the remaining cylinders.

One of the features of the present invention resides in the provision of a spindle structure and a mounting therefor permitting convenient lateral adjustment of the spacing of the axes of a plurality of spindle structures, and affording a minimum spacing less than the cylinder spacing of most all standard automotive engine blocks. While the invention is especially applicable to tool spindle structures adapted for cylinder boring, it is to be clearly understood that in its broad aspects, the invention is not limited to a spindle structure for any particular purpose.

Referring more particularly to the drawing, the spindle structure, constituting the exemplary embodiment of the invention, comprises an elongated solid bracket, body or bearing housing 5 which may be mounted on a suitable support, and is herein disclosed as secured directly to a flat mounting pad 6 on a base bracket 7. The body 5 is rectangular in cross section, with flat sides and top and bottom surfaces defining square corners, and is formed on one end with a longitudinal tubular extension or sleeve 8 having an axial bore 9. Opening from the bore 9 to the other end of the body 5, and providing an outwardly facing annular shoulder 10 at its inner end is a larger coaxial bore 11.

A rotary spindle 12 extends axially through the bores 9 and 11, and is supported therein by a plurality of spaced antifriction bearings 13, 14 and 15. These bearings preferably are of the roller type with inner and outer annular raceways and two series of interposed balls to complete the bearing relationship.

The bearing 13 supports the operative end of the spindle 12, and the bearings 14 and 15 are located in opposite ends of the bore 11 to support the spindle within the main body 5. In each instance, the inner raceway is fixed on the spindle 12 for rotation therewith, and the outer raceway is clamped in position against rotation. More particularly, the outer raceway of the bearing 13 is tightly fitted into a counterbore 16 in the free end of the sleeve 8, and is clamped in position against a shoulder 17 at the inner end of the counterbore by a seal ring or annular nut 18. This nut is removably threaded into the outer end of the sleeve 8, and extends across the space between the raceways. The spindle 12 is diametrically enlarged between the bearings 13 and 14, and the inner raceway of the bearing 13 is clamped in position against a shoulder 19 at the outer end of the spindle enlargement by a cylindrical tool head 20 threaded axially onto a reduced spindle extension 21. The tool head 20 is formed on its inner end with a coaxial central annular flange 22 extending with a close running fit into the nut 18, an outer concentric annular flange 23 interfitting with an external peripheral notch 24 in the outer end of the sleeve 8, and a short concentric intermediate annular flange 25 running in a complementary groove 26 in the nut. Consequently, the nut 18 and the tool head 20, although relatively rotatable, prevent the entry of foreign matter into the interior of the spindle body 5 and the spindle bearings.

Referring now to the bearings 14 and 15, the outer raceways and an intermediate spacer sleeve 27 are fitted into the bore 11. A nut 28 removably threaded into the outer end of the bore 11 against the outer raceway of the bearing 15 serves to clamp the assembly against the shoulder 19. A suitable oil seal ring 29, in wiping engagement with the spindle 12, is confined in position against the nut 28 by a notched lock nut 30.

To permit close spacing of the spindle axes of a plurality of the spindle structures, the body 5 is made relatively narrow, and preferably just wide enough to accommodate the widest bearings 14 and 15. Bolts 31 are provided for clamping opposite sides of the body 5 to the pad 6, and are arranged in three sets spaced axially from the bearings 13 to 15 so as not to require extra side wall thickness. The bolts of each set are staggered to avoid undue weakening of the side walls, and the bolts of the two rear sets extend through recesses 32 in opposite sides of the spacer sleeve 27. To offset any loss in strength and rigidity at the side walls by reason of the narrow width of the body 5, the top and bottom walls, particularly the latter, are increased in vertical thickness and formed with square corners, thereby providing substantial mass with an economy in lateral space. Consequently, the tubular extension 8 is disposed eccentrically or in vertically offset relation to the longitudinal center line of the body 5.

The clamp bolts 31 extend through the body 5, and are threaded into suitable nuts 33 slidable in a plurality of parallel transverse T-slots 34 in the top of the mounting pad 6. By reason of the close spacing of the bolts 31 of each set longitudinally of the body 5, both bolts are threaded into a single nut 33.

The spindle 12 may be driven by any desired means, and in the present instance is connected at the rear projecting end by a multiple belt drive 35 to an individual electric motor 36. This motor may be mounted on the top of an inverted U-shaped bridge 37 extending over the spindle structure and having spaced side walls 38 removably bolted to the top of the mounting pad 6. The top wall of the bridge 37 is sufficiently spaced from the spindle structure to permit convenient insertion therebetween of a hand wrench (not shown) for tightening and loosening the clamp bolts 31.

Any desired number of spindle structures with any desired number and character of cutting tools may be provided depending on the requirements of the work. For boring automotive engine blocks, one spindle structure for each of the aligned engine cylinders is provided, and each spindle 12 has a radially projecting single point fly tool 39 adjustably secured in the tool head 20. The spindle structures are mounted on a base bracket 7 and beneath a bridge 37 of ample dimensions, and spaced in accordance with the center distances of the successive cylinders. The bridge 37 is provided with side extensions 40 to afford an adequate mounting surface for the spindle motors 36.

The various spindle brackets 5 may be disposed in flat side engagement on the mounting pad 6 for minimum spacing. To provide a larger spacing or an uneven spacing as required for different engine blocks, suitable flat rectangular spacer blocks 41 of proper thicknesses may be interchangeably interposed between the various spindle brackets 5. For spacing less than that shown, the pulleys on the spindles 12 may be staggered to avoid interference. In assembly, the brackets 5 and blocks 41 are positioned underneath the bridge 37 in desired spaced relation, and are held together against one side wall 38 of the bridge by screws 42 threaded through the other side wall 38 while the clamp bolts 31 are being tightened. To provide for simultaneously longitudinal reciprocation of the spindles 12, the base bracket 7 may be secured to a carriage 43 slidable on a machine tool base 44.

I claim as my invention:

1. A unitary demountable spindle structure comprising, in combination, a transversely narrow rectangular spindle body having relatively thin side walls with flat parallel external side surfaces and relatively thick top and bottom walls, and having an integral tubular extension on one end, antifriction bearings in said body and said extension, and a spindle mounted in said bearings and projecting from said extension.

2. A spindle structure comprising, in combination, an elongated transversely rectangular spindle body having flat parallel side surfaces and flat parallel top and bottom surfaces and having a longitudinal bore opening to one end, said body being slightly wider than said bore to provide a narrow lateral dimension and a substantially greater depth than width to provide strength and rigidity, a tubular sleeve projecting from the other end of said body in axial alignment with said bore and eccentrically of the longitudinal center line of said body, an antifriction roller bearing mounted in the outer end of said sleeve, two antifriction roller bearings separated by a spacer sleeve and removably secured in assembled relation in said bore, and a rotary spindle mounted in said bearings and having an operative end projecting from said first mentioned sleeve for the attachment of a cutting tool, said spindle being diametrically enlarged within said tubular sleeve.

3. A spindle structure comprising, in combination, an elongated transversely rectangular spindle body having flat parallel side surfaces and having a longitudinal bore opening to one end, said body being slightly wider than said bore to provide a narrow lateral dimension and a substantially greater depth than width to provide strength and rigidity, a tubular sleeve integral with and projecting from the other end of said body in axial alignment with said bore and eccentrically of the longitudinal center line of said body, spaced antifriction roller bearings mounted in the outer end of said sleeve and in said bore, and a rotary spindle mounted in said bearings and having an operative end projecting from said sleeve for the attachment of a cutting tool.

4. A spindle structure comprising, in combination, a narrow elongated transversely rectangular spindle body having flat parallel side surfaces and having a longitudinal bore opening to one end, said body being greater in height than in width, a tubular sleeve integral with and projecting from the other end of said body in axial alignment with said bore, spaced antifriction bearings mounted in said bore, a spacer sleeve in said bore between said bearings, a rotary spindle mounted in said bearings and having an operative end projecting through said first mentioned sleeve, and a plurality of clamp bolts spaced from said bearings axially of said spindle, and extending through said body and through recesses in the sides of said spacer sleeve.

5. A spindle structure comprising, in combination, an elongated flat-sided transversely rectangular spindle body relatively narrow in one lateral dimension and relatively deep in the other lateral dimension, a longitudinal bore in said body slightly less in diameter than the width of said body so as to have relatively thin side walls and relatively thick top and bottom walls, antifriction bearings mounted in said bore, a spindle journaled in said bearings and projecting from said bore, and sets of clamping bolts spaced from said bearings axially of said spindle and extending through said body between the flat sides thereof.

6. In a machine tool, in combination, a support, an integral inverted U-shaped bridge on said support, a plurality of parallel flat-sided spindle brackets mounted on said support beneath said bridge, rotary spindles journaled in said brackets, flat sided spacers removably interposed between said brackets, means for clamping said brackets and spacers together against one side wall of said bridge, means for clamping said spindle brackets to said support, and electric motors on said bridge and having drive connections with said spindles.

7. In a machine tool, in combination, a support having a plurality of transversely extending T-slots in the top thereof, a plurality of parallel flat-sided spindle structures with longitudinally projecting rotary spindles mounted for individual lateral adjustment on said support, clamping means adjustable along said T-slots and coacting therewith to secure said structures in position of adjustment, an integral inverted U-shaped bridge mounted on said support and extending in spaced relation over the major portion of said spindle structures, and a plurality of individual electric motors mounted on said bridge, and having drive connections respectively with said spindles.

8. A spindle structure comprising, in combination, a narrow elongated transversely rectangular spindle body having flat parallel side surfaces and having a longitudinal bore opening to one end, said body being greater in height than in width, a tubular sleeve integral with and projecting from the other end of said body in axial alinement with said bore and vertically offset in relation to the longitudinal center line of said body, spaced antifriction bearings mounted in opposite ends of said bore, a spacer sleeve snugly fitted in said bore between said bearings, a rotary spindle mounted in said bearings and extending through said body and said tubular sleeve, the spindle being diametrically enlarged within said tubular sleeve, an antifriction bearing for said spindle mounted in the outer end of said tubular sleeve, a plurality of longitudinally spaced sets of bolts extending vertically through said body for securing said body in position, the bolts of each set being located at opposite sides of said spindle in staggered relation longitudinally of said spindle and extending through recesses in the sides of said spacer sleeve, and another set of bolts extending vertically through said body adjacent said tubular sleeve.

9. A spindle structure comprising, in combination, a narrow elongated transversely rectangular spindle body having flat parallel side surfaces and having a longitudinal bore opening to one end, said body being greater in height than in width, spaced antifriction bearings mounted in opposite ends of said bore, a spacer sleeve snugly fitted in said bore between said bearings, a rotary spindle mounted in said bearings and extending through said body and said spacer sleeve, and a plurality of longitudinally spaced sets of bolts extending vertically through said body for securing said body in position, the bolts of each set being located at opposite sides of said spindle in staggered relation longitudinally of said spindle and extending through recesses in the sides of said spacer sleeve.

10. In a machine tool, in combination, a support having a plurality of transversely extending T-slots in the top thereof, an inverted integral U-shaped bridge having parallel sides secured to said support, a plurality of parallel flat-sided spindle structures with longitudinally projecting rotary spindles mounted on said support within said bridge for individual lateral adjustment along said slots, a plurality of spacers interposed between the sides of said spindle structures and the sides of said bridge for locating said spindle structures in predetermined spaced relation, clamping means extending adjustably through one side of said bridge for clamping the assembly of said spindle structures and spacers against the other side of said bridge, and a plurality of clamping bolts extending through said spindle structures and coacting with nuts within said slots for securing said spindle structures rigidly to said support, the top of said bridge being spaced from said spindle structures to afford access to said bolts.

11. A unitary demountable spindle structure comprising, in combination, a transversely narrow spindle body having relatively thin side walls with flat parallel external side surfaces and relatively thick top and bottom walls with the bottom wall having a flat external mounting surface, longitudinally spaced antifriction bearings in said body, and a spindle mounted in said bearings and projecting from one end of said body, said body being formed with holes adapted to receive clamping bolts and opening vertically therethrough wholly between said flat parallel side surfaces.

12. A unitary demountable spindle structure comprising, in combination, a transversely narrow spindle body having relatively thin side walls with flat parallel external side surfaces and relatively thick top and bottom walls with the bottom wall having a flat external mounting surface, longitudinally spaced antifriction bearings in said body, and a spindle mounted in said bearings and projecting from one end of said body and having portions of relatively large and small diameters along its length, said body being formed between said bearings in the region of the relatively small portion of said spindle and wholly between said flat parallel side surfaces with holes opening vertically through said body for the reception of clamping bolts.

13. In a machine tool, in combination, a movable support, a base bracket mounted on said support and being formed with a plurality of transversely extending T-slots in the top thereof, a plurality of parallel narrow flat sided spindle structures with longitudinally projecting rotary spindles mounted for individual lateral adjustment on said bracket, an upstanding wall on said bracket along one side margin thereof, means for clamping said spindle structures in parallel predetermined spaced assembled relation laterally in position against said wall, and clamping bolts extending vertically through said spindle structures between the flat sides thereof and coacting with nuts within said slots for securing said spindle structures individually and rigidly to said bracket.

IRA J. SNADER.